April 28, 1964   M. A. NEWMAN, JR   3,130,520
BURIAL VAULTS

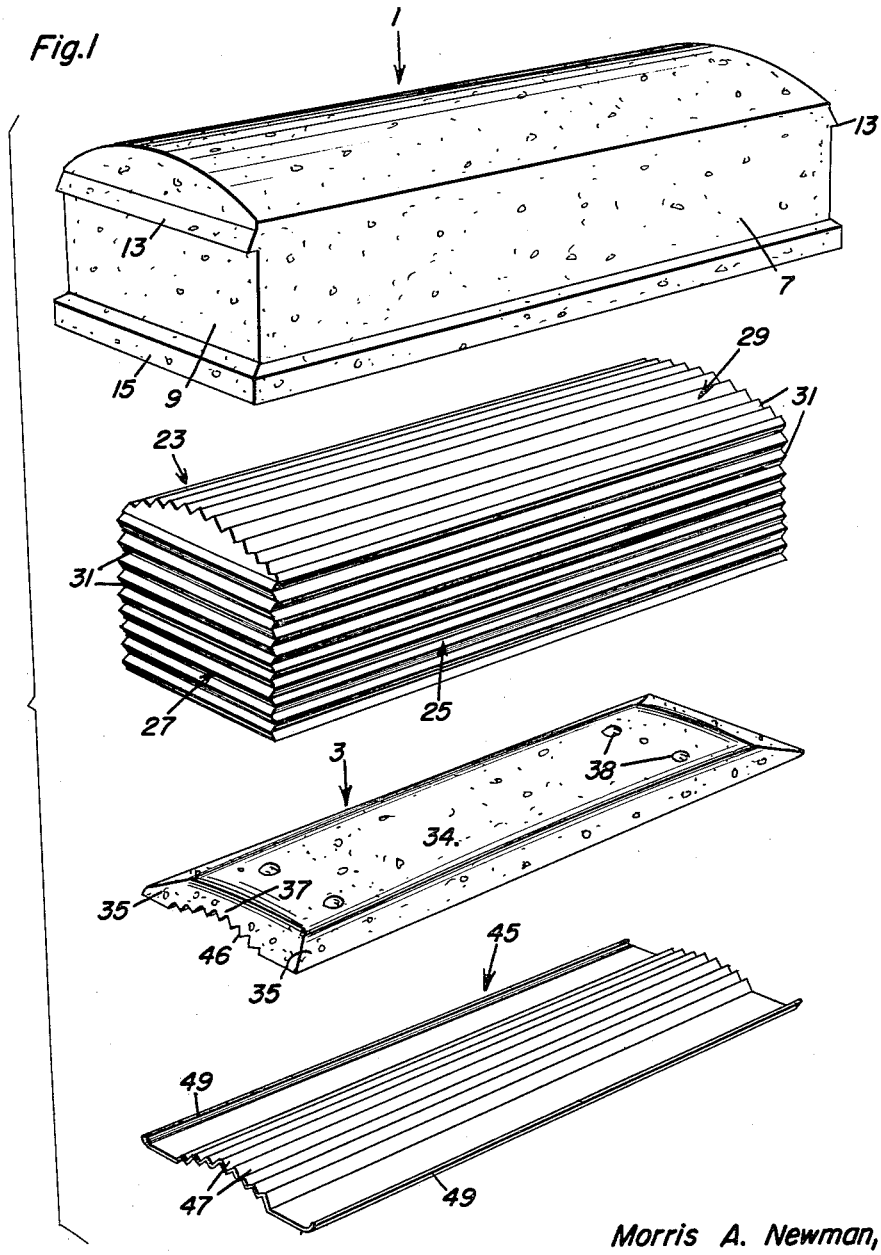

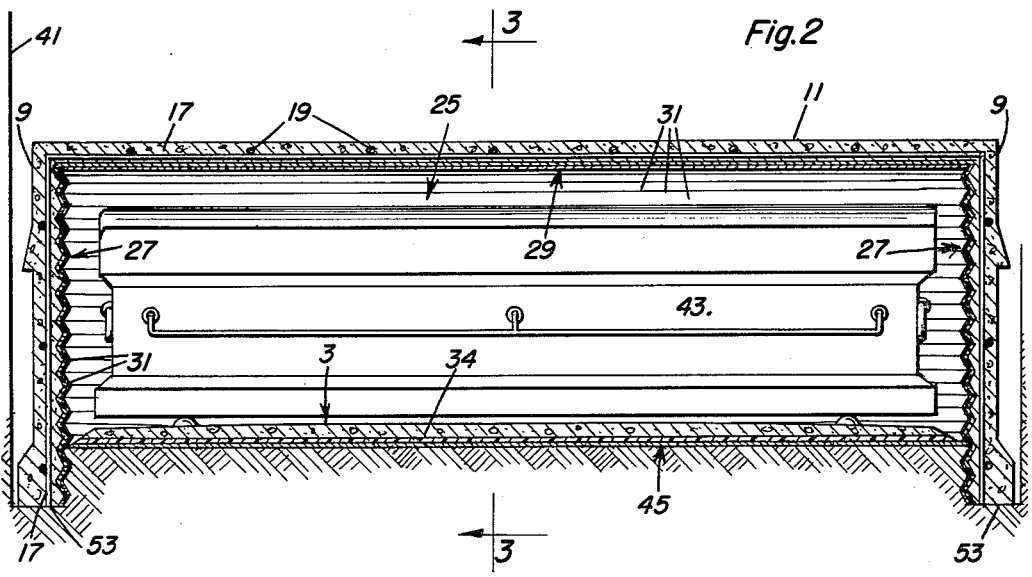
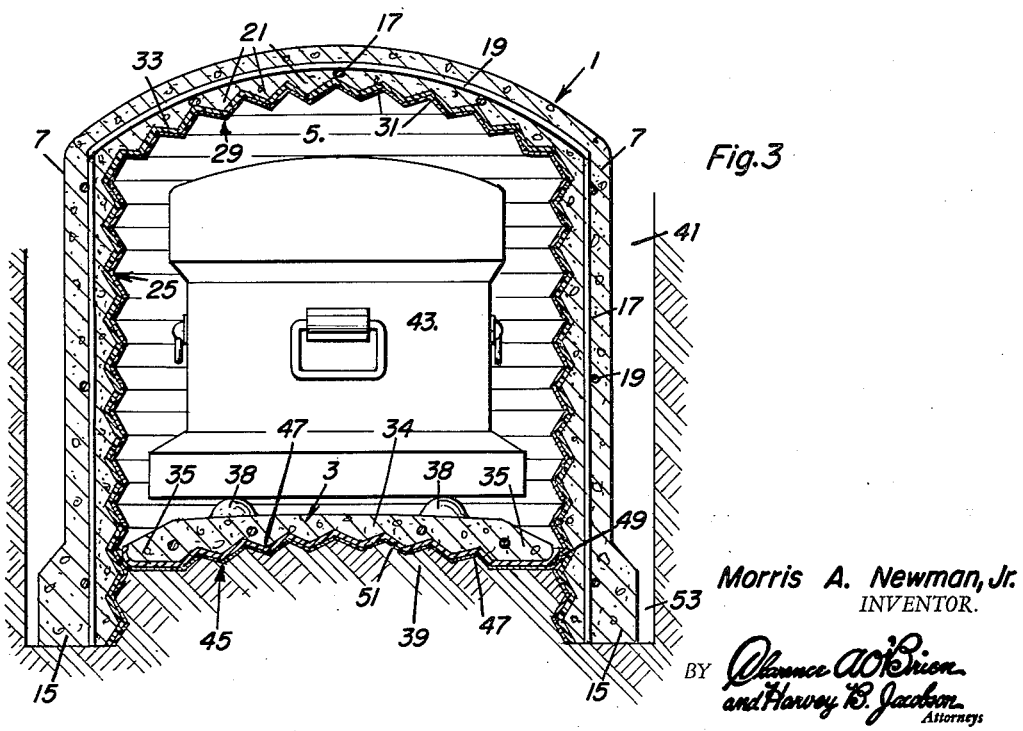

Filed Nov. 14, 1960   7 Sheets-Sheet 3

Morris A. Newman, Jr.
INVENTOR.

BY *Clarence A. O'Brien*
*and Harvey B. Jackson*
Attorneys

April 28, 1964  M. A. NEWMAN, JR  3,130,520
BURIAL VAULTS
Filed Nov. 14, 1960  7 Sheets-Sheet 5
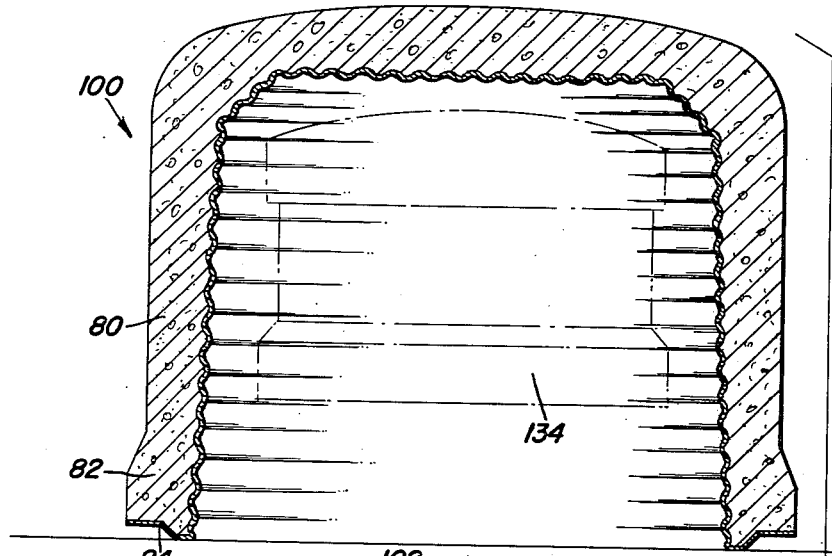
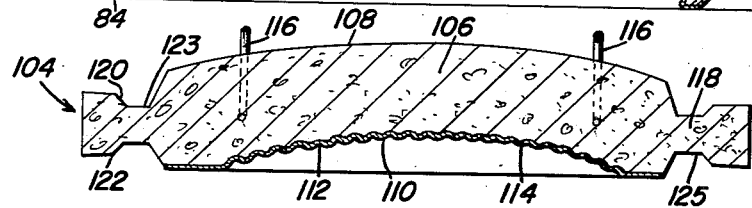
Fig. 7
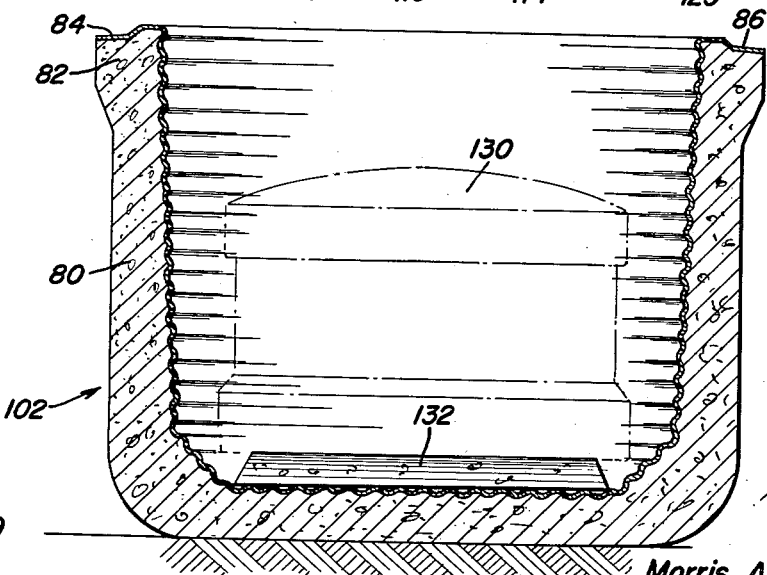
Fig. 9
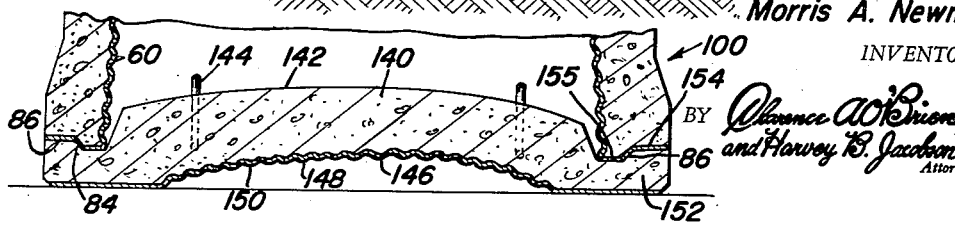
Morris A. Newman, Jr.
INVENTOR.

April 28, 1964   M. A. NEWMAN, JR   3,130,520
BURIAL VAULTS
Filed Nov. 14, 1960   7 Sheets-Sheet 6
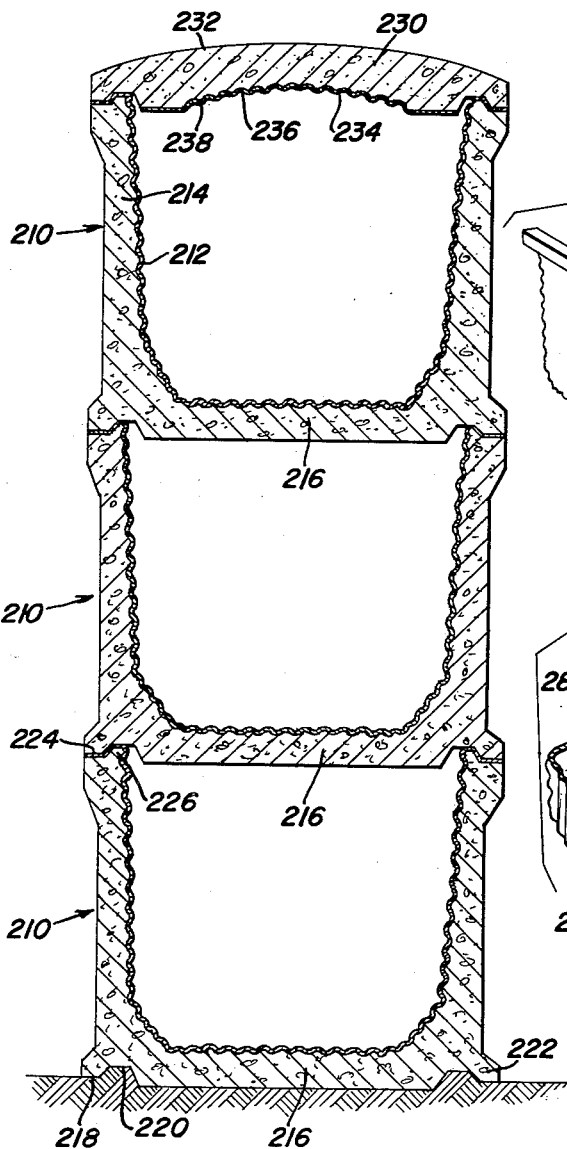
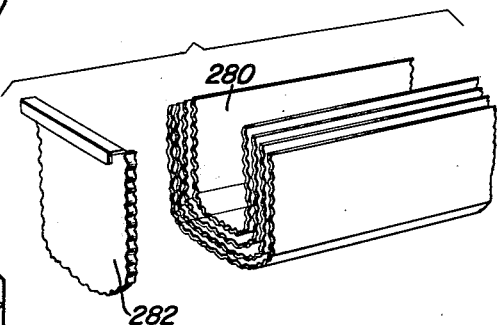
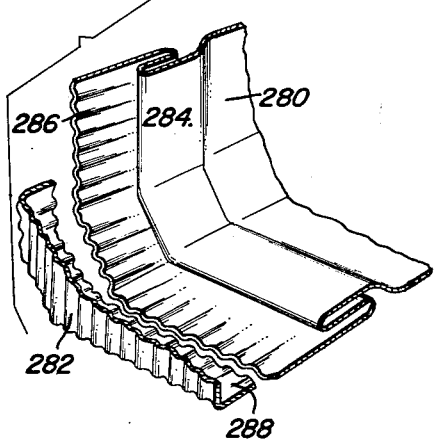
Morris A. Newman, Jr.
INVENTOR.

April 28, 1964  M. A. NEWMAN, JR  3,130,520
BURIAL VAULTS
Filed Nov. 14, 1960  7 Sheets-Sheet 7

Morris A. Newman, Jr.
INVENTOR.

United States Patent Office 3,130,520
Patented Apr. 28, 1964

3,130,520
BURIAL VAULTS
Morris A. Newman, Jr., P.O. Box 567, Eldorado, Ill.
Filed Nov. 14, 1960, Ser. No. 71,862
1 Claim. (Cl. 50—91)

The present invention relates generally to burial vaults and more particularly is directed to the novel and advantageous construction and production of a burial vault having greatly superior properties with regard to effective protection of the casket housed therein from damage arising from water, earth shocks and the like.

In order to obtain a burial vault which will protectively enclose a burial casket therein for a long period of time against crushing by the surrounding soil arising from soil movement induced by various causes, damage from vermin or water, it has been heretofore proposed to employ a reinforced concrete vault, a metallic vault or a combination of both. However, although such various types of vault constructions have been widely experimented with and tested by the industry, none of the available present-day constructions have been found to be entirely satisfactory in performance.

A reinforced concrete vault is well-known to provide a maximum resistance to weathering and a maximum strength for protecting a casket housed therein. However, reinforced concrete vaults are far from water impervious and further are readily subject to cracking, thereby permitting the ready ingress of water or vermin and destroying the effectiveness of the vault. Metallic constructions of vaults although establishing a vermin-proof and a waterproof enclosure for a casket are relatively short lived inasmuch as they are easily attacked by chemical components of the soil so that actually their expected period of life is probably less than that of a reinforced concrete vault.

In an attempt to combine the advantages of strength and long life inherent in a concrete vault with the waterproof qualities expected of a metallic vault, a third type of vault has been tried by the industry in which a metallic liner is inserted into a concrete vault. Although such a lined vault possesses superior properties to either of the two preceding types, in that it offers greater strength and a longer life due to its concrete exterior and yet establishes a vermin and waterproof seal for the interior of the vault by means of a metallic lining, there are a number of disadvantages attending the construction and use of this type of vault as previously practiced by the industry.

It has been heretofore the practice to first cast, mold or form the outer concrete shell of a vault and thereafter attempt to insert therein and press into place therein a preformed metallic liner. Such practice has been accompanied by a number of heretofore insurmountable difficulties. First, it has been found to be substantially impossible from a practical standpoint to control with sufficient accuracy the shape and size of the cavity of the concrete vault outer shell and of the preformed metallic liner therefor so that these preformed elements can be subsequently assembled and fitted together in a snug, close relationship. Invariably, irregularities, usually in the concrete outer shell, have resulted in a deformation of the liner as the same is forced into place thereby marring the appearance of the same as well as in some instances impairing the waterproof and wearing qualities thereof. Moreover, such heavy gauge metal was necessary for the liner that the sun's heat would cause a considerably greater expansion of a metal liner than of the concrete body in which the liner was to be inserted resulting in cracking of the concrete. Further, owing to the deformation of the liner as the same is pressed into the vault concrete outer shell, an undesirable marring of the symmetrical appearance of the interior of the vault usually resulted.

It is therefore the primary and fundamental purpose of this invention to provide a burial vault in which a preformed concrete outer shell and a preformed metallic or other waterproof liner are assembled in an improved manner to combine the advantages of the two different materials to the utmost.

It is a further object of this invention to provide a burial vault which will readily lend itself to all of the various types and designs of burial vaults now commonly prevalent in the industry while obtaining the benefits of the maximum life expectancy and strength of a concrete vault together with the vermin and waterproof sealing qualities of a metallic or other fluid impervious liner therefor.

A further and very important object of the invention is to provide a burial vault construction in which a waterproof liner or shell is bonded to the concrete outer vault form in a more secure and permanent manner than has been heretofore possible.

Still another object of the invention is to provide a burial vault in which a more intimate bond is obtained between a waterproof liner therefor and the concrete outer material of the vault by pouring or molding the concrete material about the liner during the formation of the vault.

Still another object of the invention is to provide an improved burial vault in accordance with the foregoing objects which will enable the use of a corrugated internal surface for the vault when desired.

An additional object of the invention is to provide a burial vault construction as set forth in the foregoing objects in which a corrugated metallic liner may be employed upon the interior of the vault and may be bonded into the concrete material in an improved manner.

Yet another object of the invention is to reduce the cost of construction, facilitate the ease of handling, shipping, storage and construction of sheet metal liners for burial vault constructions and reduce the volume occupied by such liners during transportation and storage by forming panel-like components of predetermined size and shape and uniting them into a single unitary liner by the use of conventional joints such as the Acme and Pittsburgh seams; and to utilize such joints as anchoring means for more intimately bonding the latter into the concrete material of the vault.

A still further important object of the invention is to provide a burial vault construction which will enable the use of a plastic liner for the interior of the vault.

Yet another more specific object of the invention is to provide a burial vault construction in which a corrugated plastic liner may be successfully employed for the interior of the vault and may be intimately bonded with the concrete material of the vault to both provide a more secure bonding of the liner to the vault and to improve the water-proofing quality of the vault.

It is a further and more specific object of the invention to provide a burial vault construction in accordance with any of the preceding objects and in which identical vault units or components may be assembled together by means of an adapter or connector plate to thereby form a combination double-decker vault having improved sealing means therebetween.

An additional object of the invention is to provide a burial vault construction which will facilitate and render more practical the construction of a multiple deck vault for multiple burials and which will enable a relatively few standardized vault component units to be assembled in a stacked relation in tiers to form either top seal or bottom seal vault units therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–3 disclose a telescoping base type of vault set forth in my above identified co-pending application, and in which:

FIGURE 1 is an exploded perspective view of the various components of the telescoping base vault;

FIGURE 2 is a view in vertical central longitudinal section through the vault of FIGURE 1 and showing the position of a casket therein and illustrating the manner in which the telescoping base of the vault is vertically positionable therein;

FIGURE 3 is a vertical transverse sectional view taken upon an enlarged scale substantially upon the plane indicated by the section line 3—3 of FIGURE 2;

FIGURE 7 is an exploded view in vertical transverse section through a double-deck vault construction and illustrating the adapter plate which is connected to a lower vault component to form a top seal vault therewith; and to a top vault, to form a bottom seal vault therefor and to combine the top and bottom vaults into a single waterproofed construction;

FIGURE 9 is a view in vertical transverse section through a base which may be employed with the top vault component of FIGURE 7 in place of the adapter plate shown therein to form a bottom seal single vault unit therewith;

FIGURE 11 is a view in vertical transverse section of still another vertically stacked multiple unit vault construction which may be created and from a single type of vault body to form a tier of top sealed vaults;

FIGURE 13 is a fragmentary detailed view in perspective illustrating the compact manner of packaging in knockdown form for transportation or storage the body and end components of one form of corrugated sheet metal vault liner;

FIGURE 14 is a view in perspective of a structural detail for joining the end and body components of the vault liners;

Figure 4:
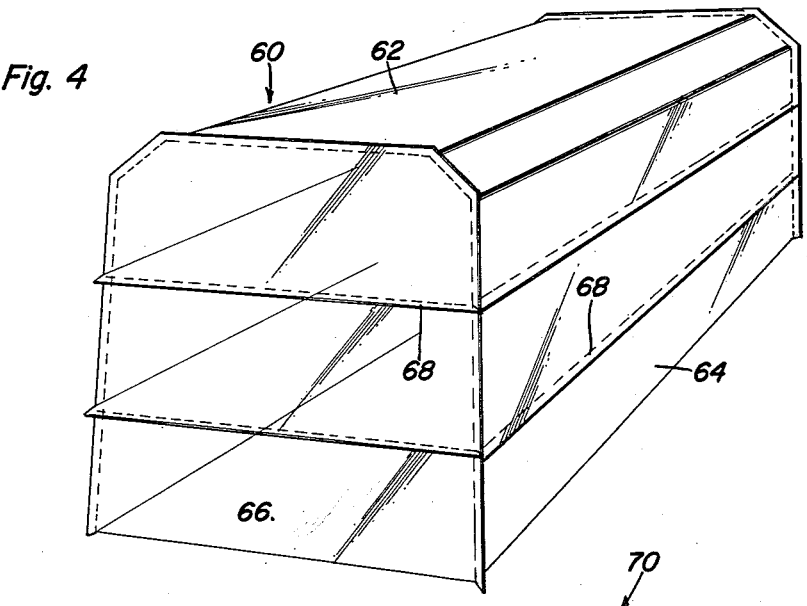
FIGURE 4 is a perspective view of a casket liner which may be used as a liner for concrete vaults in accordance with this invention.

This application is a continuation-in-part of my prior application Serial No. 697,004, filed November 18, 1957, and of the same title and which is now abandoned.

Referring first to the embodiment of FIGURES 1–3 which forms the subject matter of my above identified copending prior application and in which the same drawings and numerals are employed as in my copending application, it will be observed that the vault of this construction comprises a hollow, open bottom cover section 1 of molded concrete adapted to be telescoped downwardly over a casket supporting base slab 3 of molded concrete to form therewith a casket chamber 5.

The cover section 1 is substantially rectangular with side walls 7, end walls 9 and a transversely arched top 11. The end walls 9 are provided with handgrips 13 for carrying the vault and the cover section is formed with an externally thickened reinforcing bottom edge 15.

Reinforcing steel rods 17, 19 are extended into the cover section 1 to extend vertically and horizontally in the sides and end walls 7, 9 and horizontally and transversely in the top 11. The entire inner surface of the cover section 1 is corrugated horizontally, the corrugations 21 being formed during molding of the cover section.

An open bottom sheet metal, protective liner shell 23 is provided in the cover section 1. The liner shell 23 is also rectangular with side and end walls 25, 27 and a transversely arched top 29 and fits in the cover section 1 to completely line the same but with a slight clearance for a purpose presently seen. The liner shell 23 is provided through substantially its entire surface with horizontal corrugations 31 to interfit with the corrugations 21 of the cover section 1 and is coated externally with a layer 33 of asphalt forming a resilient cushion layer between said cover section 1 and said liner shell 23.

The corrugations 21, 31 and resilient layer 33 retain a liner shell 23 in place but without bonding the liner shell 23 to the cover section 1.

The base slab 3 comprises a rectangular, slightly convex topped, concrete body 34 having beveled flat bottom edge 35 and a transversely arched bottom 37 reinforced by longitudinal corrugations 46. Corner knobs 38 on top of the member 34 are provided for supporting a casket 43 in the chamber 5 in spaced relation to said slab 3. A protective liner plate 45 of resilient steel is provided on the bottom 37 of the member 34 and which conforms in shape to said bottom and is longitudinally corrugated, as at 47 to interfit with the corrugations 46 and provided with upwardly and inwardly curved edges 49 hooking over the edges 35 of the member 34 to hold said member 34 and plate 45 together. The liner plate 34 is coated on its top with a resilient layer 51 of asphalt to form a cushion layer between said member 34 and the liner plate 45. The slab 3 is dimensioned to fit in corrugations 31 of the liner shell 23 with a snap action when the cover section 1 is telescoped downwardly over the slab 3, this being permitted because the resiliency of the layers of the asphalt 33, 51, and also because of the resiliency of the corrugations 31 of the liner shell 23 and the resiliency of the liner plate 45.

The use and operation of the described vault will be readily understood. The base slab 3 is imposed on the bottom 39 of the grave 41 with a trench 53 dug around the base slab 3 to a depth predetermined according to the height of the casket 43. The casket 43 is then lowered onto the base slab 3. Then the cover section 1 is lowered and telescoped over the base slab 3 and pushed down until the bottom edge 15 seats in the trench 53. Thus, it will be seen that the cover section 1 and the base slab 3 may be telescopingly fitted together in sealed relation to form a compressed air space in the top of the chamber 5 variable in size according to the size of the casket 43 and which will tend to exclude dampness. The latter plate 45 obviously prevents corrosion of member 34 from water and dampness accumulating in the bottom of the grave 41. The corrugations 21, 31, strengthen the cover section 1 and the liner shell 23, whereas the corrugations 37 of the member 34 and the corrugations 47 of the liner plate 45 strengthen the base slab 3 and together with the edges 49 of the liner plate 45 serve to hold the member 34 and the liner plate 45 in position without bonding to the member 34. The resilient, corrugated resiliently backed liner shell 23, and resilient, resiliently backed liner 45 form efficient means for interlocking the edges of the base slab 3 and the cover section 1 in variably spaced relation to the top 11 of the cover section 1 to form compressed air spaces in the chambers 5 of different depths, and the layers of cushion material 33, 51 form expansion means tending to prevent cracking of the cover section 1 and member 34 from expansion and contraction thereof.

It should be particularly noted that the corrugations of the liner 23 may serve to establish an interlocking or bonding engagement with the corresponding corrugations on the cover section 1. Thus, in some instances, the cover section 1 may be formed by first supporting metallic liner 23 upon a suitable form and then pouring or molding the concrete material of the cover section 1 thereabout. In this operation it will be observed that the penetration or embedment of the corrugations 31 of the latter and the concrete material of the cover section 1 will obtain an intimate bond therebetween effectively preventing separation of the liner and the cover section thereby contributing to the long life of the vault as well as to its water-proof qualities.

It will also be understood that there is provided a slight inward upward taper or convergence of the sides and for the end walls of the cover section so that as the base slab 3 is moved upwardly thereinto it will wedge tightly in the corrugations further enhancing the sealing properties of this construction.

Reference is next made to FIGURE 4 wherein there is indicated generally by the reference numeral 60 a waterproof liner to be bonded to the internal surface of a vault. Although FIGURE 4 discloses a liner of a suitable plastic material, any other suitable material can be used possessing the necessary properties of water or moisture imperviousness. Resistant to acidic and corrosive effects of the soil, resistant to vermin and the like, it is to be understood that this liner can also in some instances be formed of sheet metal construction.

The liner 60 is of a one-piece construction consisting of a top 62, side walls 64 and end walls 66. In some instances a single piece of material may be provided for fabrication of the liner, while in other instances separate pieces of material may be secured together in any desired manner to form the complete liner. It will be understood that this liner will be given approximately the same shape and dimensions as that of the internal surface of the concrete vault body with which it is to be used, it being desirable that the liner shall be of a plastic material and that the liner shall be slightly oversize and be provided with pleats or folds as at 68 therein upon the side end walls for a purpose to be subsequently set forth.

The advantages of using a plastic liner are the inherent characteristics of being moisture-proof and vermin-proof; readily fitted to the contour of the concrete vault by virtue of its pliability; easily and intimately bonded to the vault material, inexpensiveness; and the property of being capable of being easily and readily folded into a compact size to facilitate transportation or storage.

Figure 5:
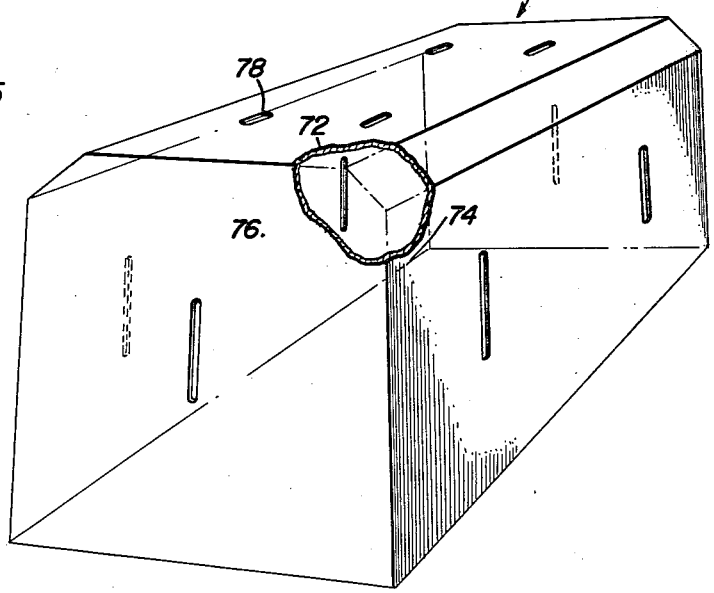
FIGURE 5 is a perspective view of a support for the plastic liner of FIGURE 4 to hold the same in proper position as the concrete material of the vault is molded about the plastic liner, parts being broken away and shown in section therein.

In this embodiment of the invention, there is provided a support indicated generally by the reference numeral 70, shown in FIGURE 5, by which the liner 60 is supported in its expanded or distended form so that the concrete material may be poured or molded thereabout to thereby intimately bond the liner to the concrete material of the vault during the forming of the latter.

Preferably, as shown in FIGURE 5, the liner support form may be of a hollow shell-like construction and may consist of sheet metal material if desired, including a top wall 72, side walls 74 and end walls 76. Slots or openings 78 are preferably provided at the top wall 72 and similar slots or openings may be provided at the side or end walls for a purpose to be subsequently apparent.

When it is desired to form a lined vault in accordance with this form of the invention, the liner 60 whether of plastic or sheet metal is erected upon the support form 70, while the latter is disposed in a suitable outer mold form.

It should be noted that due to the slight oversize or fullness of the material of the liner when a plastic liner 60 is employed, there will be wrinkles as well as the pleats 68 which become embedded in a concrete material poured upon the liner as the liner is supported upon the form 70. These wrinkles and pleats will become embedded in the concrete material and thus securely bond and anchor the liner thereto.

With the use of support forms 70 and the plastic or sheet metal liners 60 there is formed a burial vault section in which a waterproof liner or barrier is bonded to the interior of the concrete material of the vault to thus render the latter water impervious as well as to improve the appearance of the interior of the vault. Generally speaking, this form of the liner will produce a smooth interior surface of the vault as will be best apparent from the detailed view of FIGURE 10. In this view, the numeral 80 indicates the open lower portion of the concrete vault to which the liner 60 is shown applied while the previously mentioned inwardly upwardly converging or tapering sides of the vault are somewhat exaggerated for clarity of illustration.

At its lower edge, the vault 80 is provided with a laterally thickened lower end portion 82 having a recessed peripherally extending shoulder 84 into which the end portion 86 of the liner 60 is forced to effect a water-tight seal therewith. This construction will be observed in each of FIGURES 7, 9 and 10. Consequently, when the vault dome 80 is placed upon or has placed thereon a complementally grooved surface such as those hereinafter described, an effective water-tight seal is established. This seal may be further enhanced by the provision of a suitable sealing material placed therebetween if desired.

As previously mentioned, the use of the liner 60 with the form 70 will produce a smooth surfaced interior of the lined vault cavity. It is also possible, however, to impart a corrugated effect to this internal surface, which corrugations as shown in FIGURES 7 and 9 possess a number of advantages. The corrugations themselves stiffen and strengthen the material forming the walls of the vault to which they are applied whether these be the sides, ends, top or bottom surfaces as shown in FIGURE 7. In addition, these corrugations serve to effect a more intimate embedment of the liner in the material of the vault thereby obtaining a better bonding action therebetween. Still further, the corrugated effect is in many instances much more attractive in appearance and is therefore preferred to the plain surface. Still further, these corrugations in conjunction with the inward tapering of the sides and end surfaces of the vault from the open top or bottom of the vault sections cooperate with the base slab, such as the slab 3 previously mentioned to effect a telescoping action and obtain a wedged and tight sealing engagement between the pallet or slab, which supports the casket within the vault, and the walls of the vault.

Figure 6:
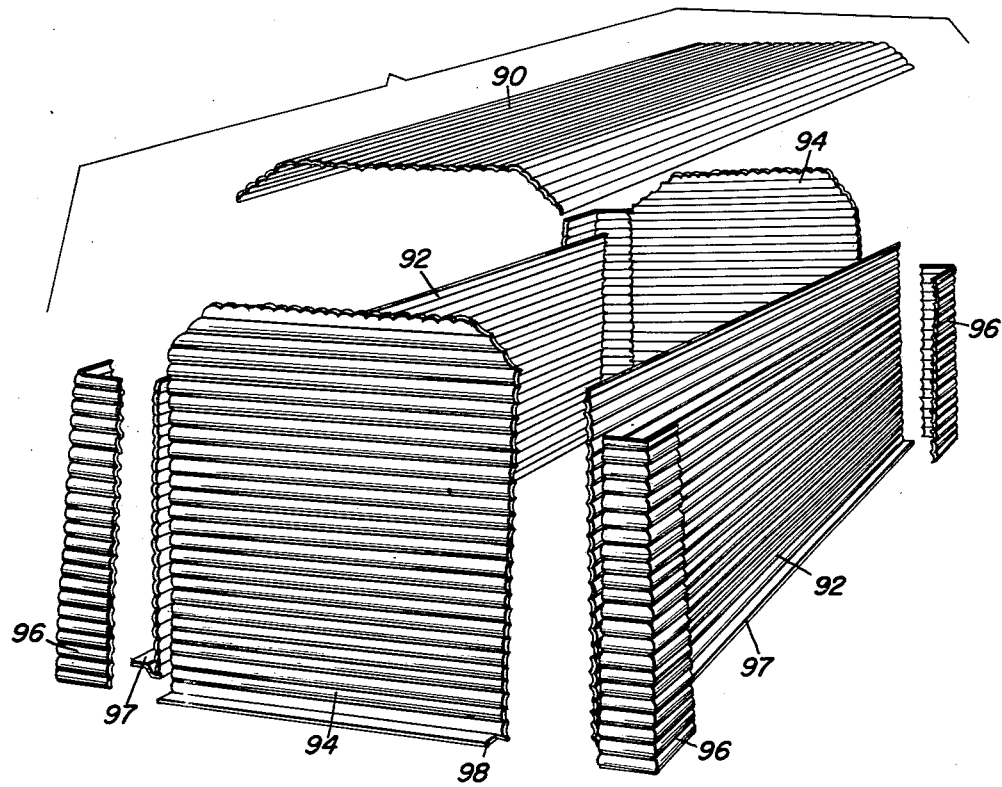
FIGURE 6 is an exploded perspective view of corrugated sheet metal components constituting a form pattern which may be used with the support of FIGURE 5 to effect corrugation of the liner of FIGURE 4; or may be used with FIGURE 5 and without the plastic liner of FIGURE 4 to directly corrugate the concrete material of the vault.

In order to obtain this corrugated effect while employing either a plastic or sheet metal liner 60 the form 70 previously mentioned is used in conjunction with the form patterns shown in FIGURE 6.

These form patterns include sheet metal panels of corrugated material including a top panel 90, side wall panels 92 end wall panels 94 and L-shaped corner panels 96. The panels are utilized by applying the side wall panels 92 and the end wall panels 94 against the corresponding sides 74 and ends 76 of the form 70. Thereupon the top panel 90 is provided upon the top surface 72 of the form. Next, the four angulated corner panels 96 are applied with their angulated perpendicular flanges overlying and embracing the adjacent vertical edges of the side and end panels 92 and 94. Thereupon the liner 60 is applied over the form panels when the latter, in turn, are applied to the support form 70. Thereafter the concrete is poured in a manner previously described. The corrugations of the patterns will thus cause embedment of the material of the top sides and end sections of the liner 60 into the poured concrete material thereby securely anchoring the mounting in place as previously mentioned.

It will be observed that the lower edges of the side and end wall panels 92 and 94 provided with outturned flanges as at 97 and 98 respectively, which cooperates with the previously mentioned lower marginal rim or flange portions 86 of the liner 60 and the shouldered recesses 84 of the vault body portion 82 to thereby force the liner into position to form the previously mentioned shouldered portions 84 of the vault body. The lined concrete vault thus produced and either with or without the corrugations is adapted for use in a variety of vault installations and arrangements.

Referring now specifically to FIGURE 7 it will be seen that each of the vault bodies thus produced is adapted to function as either a top or bottom component as indicated generally by the numeral 100 and 102 of FIGURE 7 to thus provide vault chambers for receiving therein a casket in each. These components can be combined as shown in FIGURE 7 to provide a double decker vault by using an adapter plate indicated generally by the numeral 104. This plate comprises a concrete slab 106 having preferably a convex top surface 108 and a concave lower surface 110, the latter being provided with the longitudinally extending corrugations 112 and having a liner 114 bonded thereto in either of the matters previously described.

Embedded in the material of the body 106 and projecting upwardly from the convex surface 108 thereof are a plurality of metallic loops 116 which serve the dual functions of providing means for lifting and handling the relatively heavy slab 104 and also provide support legs upon which a casket may be supported upon the top of the adapter.

Extending laterally from the mid-portion of the body of the adapter are flat flanges 118 having marginal upwardly and downwardly projecting ribs or rims 120 and 122 upon the top and bottom surfaces respectively which thus provide grooves or channels 123 and 125 which cooperate with and receive therein the complementary downwardly projecting rim portion of the enlarged portion 82 of the vault body 80 which is adjacent to the shouldered recess 84. As previously mentioned, the cooperation of the channels or grooves 123, 125 with a correspondingly shaped surface of the enlarged end 82 of the vault body establishes an effective interlocking water-tight seal or joint therebetween.

When the two components 100, 102 are assembled by the use of the adapter 104 into a double decked vault as suggested in FIGURE 7, a casket shown in phantom at 130 rests upon a suitable pallet or support base 132 such as the slab 3 previously mentioned upon the bottom of the lower vault component 102. With the adapter plate in place, a second casket shown in phantom at 134 may be rested upon the legs 116 upon the top surface of the adapter 104 and the upper vault component 100 may then be lowered in place to enclose this casket. It will be observed that there is thus established a complete peripherally sealed engagement of the top and bottom surfaces of the adapter plate 104 with the upper component 100 and the lower component 102. Obviously, simple masking or sealing material may also be utilized at this joint if desired to enhance the waterproof properties of the construction.

The same components 100 and 102 previously mentioned which are identical with each other may be utilized independently to form either a bottom seal vault or a top seal vault respectively. Thus, as shown in FIGURE 9, there is provided a concrete slab 140 having a convex upper surface 132 in which are embedded the upwardly projecting metallic loops 144 to constitute support legs for a casket as previously mentioned, and having a concave bottom surface as at 146 which may be provided with previously mentioned corrugations 148 and a liner 150 bonded thereto. The convex portion of the base 140 is of less horizontal extent than the interior of the vault component 100 so that the same may be readily received in the open lower end of the latter as shown in FIGURE 9. However, laterally projecting from the periphery of the slab 140 is a flat plate-like rim 152 from the peripheral margin of which rises a rib 154 complementary to and engageable with the recessed or shouldered surface 84 previously mentioned. Between this rib and the convex body portion of the slab 140 is thus formed a groove or channel 155 in which is seated the unrecessed end of the enlarged portion 82 of the vault body. In this construction it is merely necessary to dispose the slab 140 in a grave, to place the casket 130 upon the support loops 144 and then lower the component 100 upon the same until the shouldered surface 84 in the lower edge of the component 100 is seated upon the rib 154 and the unrelieved portion of the enlarged end 82 of the vault body is seated in the channel or groove 155. As in the other embodiments, a suitable sealing material may be applied to this joint to further enhance the efficiency of its seal.

Figure 8:
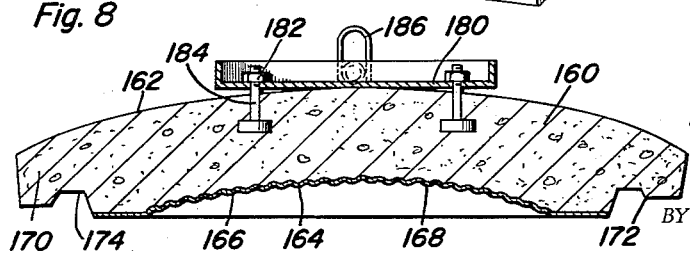
FIGURE 8 is a view in vertical transverse section of a top cover which may be used with the lower vault component of FIGURE 7 in place of the adapter plate shown therein to provide a top seal single vault unit.

When it is desired to provide a top seal vault, the component 102 is utilized. As shown in FIGURE 8, a vault cover 160 in the form of a concrete slab is provided, this having a convex top surface as at 162 together with a concave bottom surface 164 likewise having the corrugations 166 and the liner 168 in the manner previously mentioned. A laterally projecting flange 170 extends marginally about this slab and is provided with an upwardly recessed flat bottom surface 172 together with a further upwardly recessed channel or groove 174 lying between this surface and the transversely curved body portion 160. The groove and recess surface 174, 172 cooperate with the complementary surfaces 84 and the unrecessed peripheral surface of the enlarged portion 82 of the vault body to establish a water-tight joint therebetween in the same manner as the joints previously described in connection with the adapter plate 106.

In this form there may conveniently be provided a metallic plate 180 which is detachably secured to the convex top surface 162 as by means of fastening nuts 182 engaging bolts 184 which latter are embedded in the material of the slab which extend through suitable apertures in the plate 180. The plate 180 may thus serve a number of useful purposes as for example for supporting lifting hooks 186 by which the cover plate may be readily manipulated; or may function as or may receive name plates and the like.

It will thus be observed that by this construction a single standardized form of a vault body may be selectively employed by the use of a suitable type of slab as either a top seal vault, a bottom seal vault, or a double-deck vault; and this regardless of whether the lining of the component or components are smooth or corrugated.

The vault maker in accordance with this invention is thus required to stock only a relatively small number of parts and components in order to supply a variety of types of vaults demanded by the industry.

Figure 10:
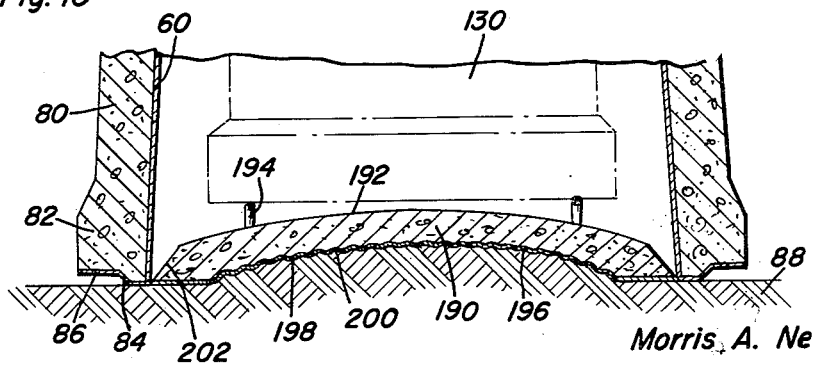
FIGURE 10 is a view in vertical transverse sectional of still another vault construction somewhat similar to that of FIGURE 3, in which a vault dome is provided with a pallet or base therein movable upwardly therein to establish a water-tight sealing engagement with the liner of the vault dome.

Referring now to FIGURE 10 it will be observed that there is produced a vault body having a smooth interior surface with the smooth liner 60 whether metal or plastic disposed therein and mounted thereto. Cooperating with the open lower end of this vault body is a pallet or slab 190. This slab likewise is a convexed top surface 192 from which rise metal loops 194 embedded therein to support thereon a casket indicated in dotted lines 130. The pallet or slab also includes a convex surface as at 196 preferably provided with corrugations 198 with a liner 200 as previously mentioned. However, the peripheral edges of this slab are beveled as at 202 and are of slightly less width than the opening at the open lower end of the vault body 80. Consequently, with this construction as shown in FIGURE 10, any upward movement of the soil will merely force this slab 190 further into the interior of the vault body and effect a tighter wedging engagement of the beveled edge 202 thereof with the lining 60, thereby obtaining a water-tight seal. It will thus be apparent that the principles of the invention are universally applicable to vaults having telescoping pallets or slabs with either a snap action upon the corrugated interior of the vault side walls or with a wedging action upon the smooth interior of the vault side walls as well as with top seal, bottom seal and double-decker vaults.

Figure 12:
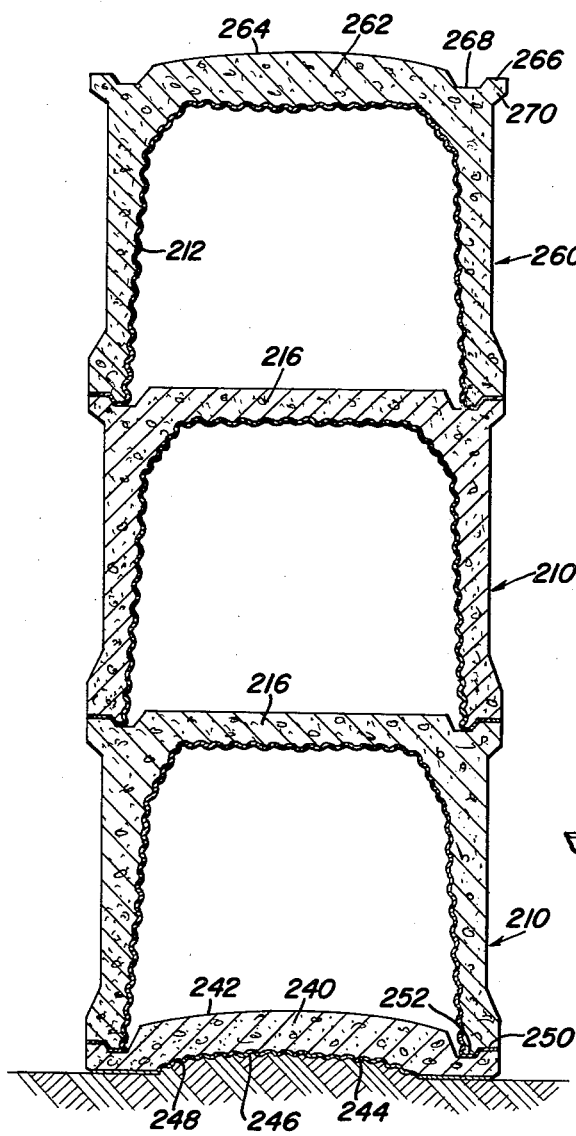
FIGURE 12 is a view similar to FIGURE 11 but illustrating a vertically stacked multiple unit vault construction wherein the vault bodies of FIGURE 11 are inverted and assembled to form a tier of bottom sealed vaults.

It is sometimes extremely desirable to assemble a plurality of vaults in tiers or vertically stacked relation for multiple burials. In order to facilitate this arrangement and enable the use of a single vault body unit regardless of whether it is desired to employ a top seal vault or a bottom seal vault, the vault body construction shown in FIGURES 11 and 12 are employed. FIGURE 11 shows a top seal vault construction while FIGURE 12 shows the same principles applied to a bottom seal vault arrangement. In each of these figures the numeral 210 designates generally the same standardized type of preformed reinforced concrete vault body having a fluid impervious liner 212 therein. The construction of this liner may be either plastic or metallic and its application to and its bonding to the concrete material of the vault unit 210 is identical with that previously described. Each of these units includes the usual side and end walls 214 together with one closure wall 216 which may be either a top or bottom wall depending upon whether the unit 210 is to form a bottom seal or a top seal vault. As illustrated in FIGURES 11 and 12, the liner is corrugated and is bonded to the material of the vault body.

In the tiered arrangement of top seal vaults shown in FIGURE 11, each of the vault units 210 is identical in construction and is disposed with its closure wall 216 as its bottom wall, while the top of the unit is open. The wall 216 has a flat exterior surface as shown in FIGURES 11 and 12 which flat surface adjacent its marginal edge is provided with a recessed plane surface 218 together with a further recessed channel or groove 220. The surface 218 further is formed as a laterally projecting or enlarged rib 222 of the unit. The open other end of the body walls 214 are provided with a flat recessed shoulder or shouldered surface 224 together with a nonrecessed projecting rib 226. The shoulder and rib 224, 226 correspond to the aforementioned shoulder 84 of the preceding forms of the invention and receive the outturned flange of the liner 212 thereon as previously mentioned. Further, the surfaces 224 and 226 are complementary to the rib 218 and the groove 220 so that as shown in FIGURES 11 and 12, these units can be stacked in vertical relation thus establishing a secure water-tight seal between each of the units 210 and the adjacent units.

In order to enclose the topmost unit there is provided a cover slab 230 preferably having a transversely curving convex top surface 232 together with a concave surface 234 upon its bottom side which concave surface is corrugated as 236 and receives therein a liner 238 in the manner previously described. When the topmost unit 210 is being applied to the tier of units, the cover 230 is then applied and the entire multiple assembly of burial vaults is thus satisfactorily sealed.

When it is desired to employ the reverse arrangement in which bottom seal vaults are formed, the arrangement shown in FIGURE 12 is provided. In this form it is necessary to provide a base plate or pallet 240 having a convex top surface 242 and a concave bottom surface 244, the latter being provided with corrugations 246 and a liner 248 as previously mentioned. The marginal portions of the base plate 240 have an upstanding peripherally disposed rim or rib 250 and there is provided a channel 252 disposed between this rib and the remainder of the base 240. The rib and channel are of course complementary to the previously mentioned surfaces 224, 226 so as to provide a sealed joint therebetween in the manner previously described. With this base in place, the units 210 are assembled in inverted relation upon base and upon each other but in the same manner as suggested in FIGURE 11. However, the slightly modified construction of a burial vault unit indicated generally by the numeral 260 is necessary to form the top or finishing member of the tier of units. The member 260 is identical with the members 210 except that instead of the flat surfaced closure wall 216, of the other units, there is provided a closure wall 262 having a convexly curved top surface 264. However, the interior of the body 260 is identical with that of the body 210 so that the same liner 212 and the same bonding action of the liner therewith may be employed.

Similarly, the closure member 262 employs the same construction of recessed surface 266 and channel or groove 268 with the same laterally projecting rib structure 270 corresponding to the structural features 218, 220, 222, respectively of the units 210.

It will thus be apparent that the present invention readily lends itself to a multiple deck tiered arrangement of burial vaults of either the bottom seal or top seal type.

When sheet metal liners are employed to render the reinforced concrete vaults water impervious, the forming of such liners in preformed permanently assembled relation renders them somewhat bulky and difficult to nest them together for transportation or storage purposes. In order to overcome this difficulty the present invention proposes the fabrication of the sheet metal liners in knockdown form providing a more compact packaging for storage or transportation. Thus, as shown in FIGURE 13, the liners consist of body components 280 of corrugated sheet metal, with separably formed end components 282. Owing to the flexibility of the U-shaped body components 280 when the end components or end walls are removed therefrom, there is sufficient resiliency of this construction to enable a plurality of these members to be nested together in a very compact manner shown in FIGURE 13. In a similar manner the individual end components 282 can be separately packaged so that the necessary ends and body members for a plurality of liners may be very compactly stacked in a minimum volume. Once the liners have reached their destination and are to be assembled it is merely necessary to apply the two end members to the opposite ends of the U-shaped body portions 280 and then secure them together as for example by the wall known Pittsburgh seam for sheet metal joints. The detailed view of FIGURE 14 shows the cooperating joint structure by which the corrugated end component 282 is secured to one end of one of the corrugated U-shaped body components 280.

Figure 15:
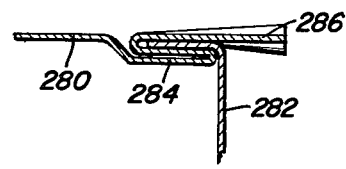
FIGURES 15 and 16 are sectional detail views showing the forming of the joint of FIGURE 14 and the manner of bonding this joint into the vault body concrete material.
Figure 16:
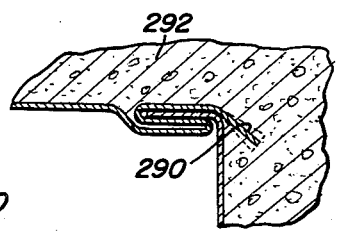

Thus, spaced inwardly a slight distance from its extremity, the U-shaped body member 282 is provided with an inwardly bent and recessed channeled section 284 constituting part of the Pittsburgh seam, there being provided an axially projecting extension 286 of the material of the body component. The end component 282 has of course a flanged portion 288 which is adapted to be slid into the Pittsburgh joint 284 as suggested in FIGURE 14 and also as shown in FIGURES 15 and 16, so that when the Pittsburgh seam is flattened the end portions will be firmly joined thereto with the extension 286 projecting therebeyond in the manner shown in FIGURE 15. This projecting end portion of each of the Pittsburgh seams, as shown in FIGURE 15 is deflected or bent slightly to the position shown at 290 in FIGURE 16 so that the mass of concrete material shown at 292 is molded about the liner, the projection 290 will form an anchor to firmly embed the liner at the joint in the concrete material of the body of the unit, and further will serve to further increase the fluid-tight seal between the two components 280, 282 of the liner.

In some instances, it may be desired to form a somewhat cheaper vault by omitting therefrom the liner 60, FIGURE 4, which is used over the inner mold form. For this purpose the liner is turned inside out before being placed over the inner mold form so that the pleats or ribs 68 do not come into contact with or become embedded in the concrete material. This enables the liner 60, after hardening of the concrete to be quickly stripped from the interior of the molded vault. This furthers the adaptability of the forms for all prices of vaults.

The previously mentioned slots 78 of FIGURE 5 are to permit the casket rest rings to be inserted, if desired, for a top seal vault. Also, they facilitate the inlet of air into the cavity when separating the finished vault from the inside core mold 70 without suction.

Figure 17:
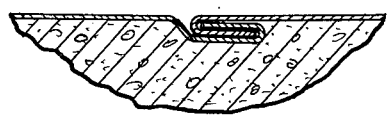
FIGURE 17 is a sectional detail view of still another joint for assembling components of the sheet metal liner and for bonding the same into the vault body concrete material.

The well known Acme seams in FIGURE 17 are alternatively utilized to join or bond the sheet metal components together to form the liners 280 as shown in FIGURE 13.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A burial vault comprising a rectangular bottom slab having beveled edges, an open bottom hollow cover for said slab telescoping downwardly over the slab to form with the slab an enclosed chamber for a coffin, said cover having side and end walls, a resilient liner in said cover on said side and end walls having horizontal corrugations interfitting with the beveled edges of the slab with a snap action in response to variable telescoping of said cover downwardly over said slab, whereby to provide for varying the depth of the chamber for coffins of different sizes, the side and end walls of said cover being corrugated in correspondence with the corrugations of said liner and a layer of cushion material between said liner and said side and end walls whereby said liner is held in place without bonding to said side walls and said walls are moisture-proofed internally.

References Cited in the file of this patent

UNITED STATES PATENTS

| | | |
|---|---|---|
| 755,866 | Freeman | Mar. 29, 1904 |
| 833,502 | Boyles | Oct. 16, 1906 |
| 1,684,614 | Barton | Sept. 18, 1928 |
| 1,871,976 | Fraber | Aug. 16, 1932 |
| 1,932,792 | Loresch | Oct. 31, 1933 |
| 2,038,300 | Kueitner | Apr. 21, 1936 |
| 2,162,435 | Hopkins | June 13, 1939 |
| 2,181,194 | Martin | Nov. 28, 1939 |
| 2,192,104 | Reynolds | Feb. 27, 1940 |
| 2,816,323 | Munger | Dec. 17, 1957 |
| 2,822,685 | Chandler et al. | Feb. 11, 1958 |
| 2,913,895 | Blasins et al. | Nov. 24, 1959 |

FOREIGN PATENTS

| | | |
|---|---|---|
| 371,591 | Italy | May 30, 1939 |
| 22,523 | Finland | June 15, 1948 |
| 728,229 | Great Britain | 1955 |